United States Patent
Eslambolchi et al.

(10) Patent No.: US 6,609,855 B1
(45) Date of Patent: Aug. 26, 2003

(54) COLOR-PIGMENTED UTILITY CONVEYANCE

(75) Inventors: Hossein Eslambolchi, Los Altos Hills, CA (US); John Sinclair Huffman, Conyers, GA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 10/079,028

(22) Filed: Feb. 19, 2002

(51) Int. Cl.[7] .......................... F16L 57/04; G01V 15/00
(52) U.S. Cl. ................... 405/157; 405/184.1; 116/211; 138/104
(58) Field of Search .................. 138/104; 405/157, 405/160, 184.1, 154.1; 116/211

(56) References Cited

U.S. PATENT DOCUMENTS

| | | | | |
|---|---|---|---|---|
| 3,115,861 A | * | 12/1963 | Allen | 405/157 |
| 3,448,586 A | * | 6/1969 | Mailen et al. | 405/157 |
| 3,504,503 A | * | 4/1970 | Allen et al. | 405/157 |
| 3,533,243 A | * | 10/1970 | Suydam | 405/157 |
| 3,581,703 A | * | 6/1971 | Hosack | 116/67 R |
| 3,718,113 A | * | 2/1973 | Schertler et al. | 116/214 |
| 3,862,349 A | * | 1/1975 | Watts | 174/11 R |
| 4,988,236 A | * | 1/1991 | Ramsey et al. | 405/157 |
| 5,200,704 A | * | 4/1993 | Clark et al. | 324/326 |
| 5,967,079 A | * | 10/1999 | Eslambolchi et al. | 116/211 |
| 2002/0085884 A1 | * | 7/2002 | Harris | 405/154.1 |

* cited by examiner

*Primary Examiner*—J. J. Swann
*Assistant Examiner*—Katherine Mitchell

(57) ABSTRACT

A utility conveyance (10), such as a pipe, cable or duct, designed for burial in surrounding earth (12) carries a passive warning mechanism (16), preferably a water-soluble dye embedded in the conveyance. The dye, when exposed to moisture (e.g., rainwater in the surround earth) will bleed from the conveyance and discolor the surrounding soil, thus alerting any contractor attempting to excavate in the surrounding area.

9 Claims, 2 Drawing Sheets

COLOR-PIGMENTED UTILITY CONVEYANCE

TECHNICAL FIELD

This invention relates to a utility conveyance, such as a pipe or cable, especially designed for burial.

BACKGROUND ART

Many utilities, such as AT&T, bury their pipes and cables ("utility conveyances") underground both for reasons of safety and esthetics. Underground burial provides protection to such utility conveyances against weather and other sources of potential damage. Utilities that undertake burial of their conveyances usually make extensive efforts to plot the location of each buried conveyance on a map to facilitate its location in case of repair or replacement. While a map will indicate the general location of a buried conveyance, more precise location information often becomes necessary, particularly in urban environments. For that reason, most utilities that bury their conveyances underground typically rely on electromagnetic signaling techniques to precisely locate such conveyances.

U.S. Pat. No. 5,644,237, issued in the names of Hossein Eslambolchi and John Huffman, on Jul. 1, 1997, and assigned to AT&T, (incorporated by reference herein) discloses an electromagnetic signaling technique for locating a buried utility conveyance. A signal generator applies a locating signal and a confirmation signal to a metallic part of the conveyance. In the case of an optical fiber cable, the metallic part comprises either a metallic sheath or a copper trace wire within the cable. Using a signal detector, a technician detects both the locating signal and the confirmation signal radiated above ground to precisely locate the buried conveyance.

After locating a buried conveyance, a technician for the utility will typically mark the surrounding area with an environmentally benign paint to alert an excavating contractor of the presence of the buried conveyance. By industry agreement, utilities have standardized on certain colors to mark the following:

| | |
|---|---|
| Orange | Telephone, communications, television (CATV) |
| Yellow | Gas and gas distribution |
| Blue | Water |
| Green | Sewer |
| Red | Electric |
| White | Proposed work area |
| Purple | Water system and slurry |
| Pink | Survey area |

Most jurisdictions require contractors seeking to excavate in a particular area first undertake to contact the affected utilities prior to digging so that each may mark its buried conveyance(s). Thus, the contractor will know what type of utility conveyance or activity is present and can take the appropriate precautions prior to digging based on the color employed to mark the affected area. Unfortunately, some contractors fail to contact the affected utility. A utility, even if contacted by a contractor, may fail to mark the affected area. Either failure will have disastrous consequences if a contractor, unaware of the conveyance, begins to excavate and causes damage.

This, there is need for an additional warning mechanism for alerting a contractor of the existence of a buried utility conveyance which does not require the intervention of either the contractor or the utility.

BRIEF SUMMARY OF THE INVENTION

Briefly, in accordance with a preferred embodiment, there is provided a passive warning mechanism associated with a utility conveyance, typically in the form of a pipe, duct or cable, for burial in surrounding earth. The warning mechanism takes the form of a water-soluble material, typically a water-soluble environmentally benign dye, carried by the conveyance. The water-soluble material, upon exposure to moisture, will bleed from the conveyance into the surrounding earth to mark the surrounding earth a distinctive color. Thus, a contractor starting to excavate in the vicinity of the conveyance will notice the dye-colored surrounding earth and thus become aware of the presence of the buried conveyance, thus taking appropriate action to avoid possible damage.

DETAILED DESCRIPTION

Figure 1:
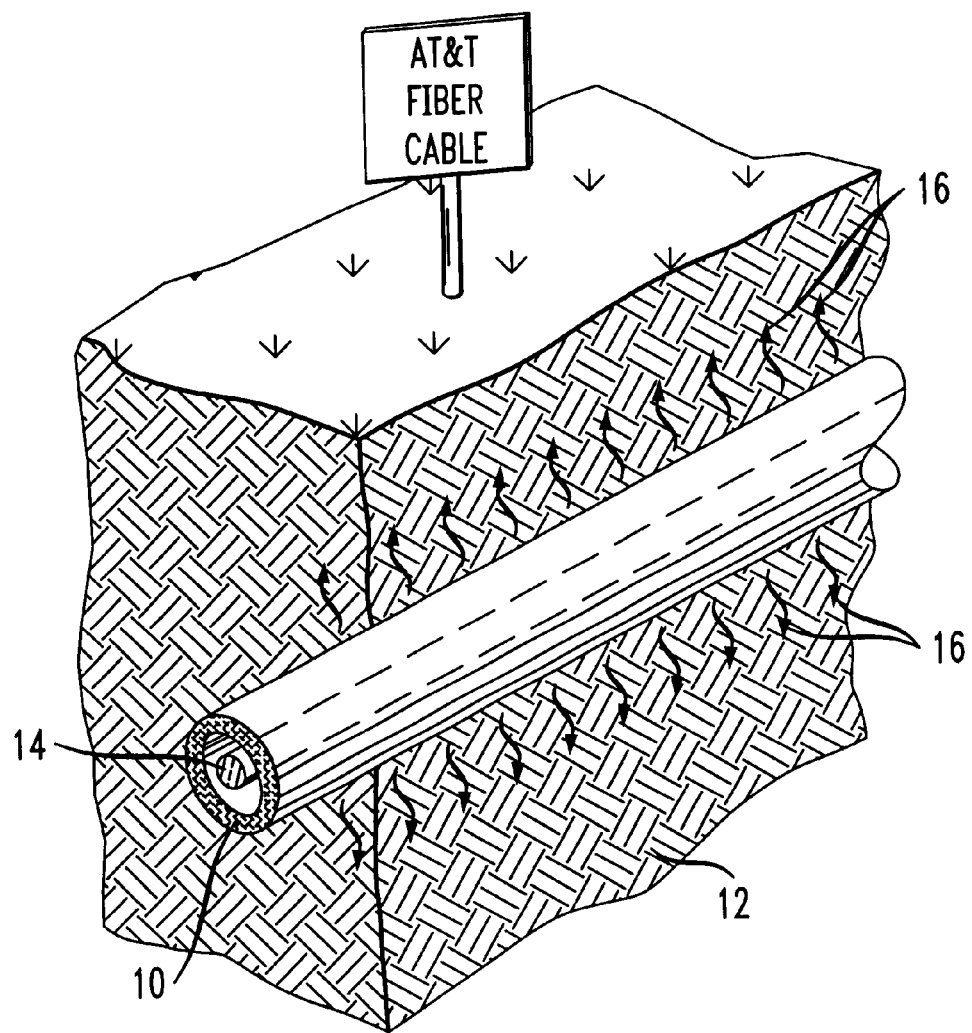
FIG. 1 shows a schematic view in perspective of a utility conveyance in accordance with a preferred embodiment of the invention having an associated passive warning mechanism.

FIG. 1 shows a schematic view of a utility conveyance 10, which in the illustrated embodiment, takes the form of a duct or the like made from a flexible, environmentally inert material such as plastic or the like. A utility typically will bury the duct in surrounding earth 12 below the surface 13 so as to run between telecommunications facilities (not shown). The duct 10 encloses at least one and preferably, a plurality of fiber optic cables 14 (only one of which is shown).

In practice, the duct 10, with its enclosed fiber optic cable(s) 14 generally lies a distance below the earth's surface 13 so that the duct and cable remain protected. The utility that undertakes burial of the duct 10 will usually make extensive efforts to plot the location of the duct to enable the utility to alert contractors in the event of planned excavation in the nearby area. Indeed, the responsible utility, upon learning of a contractor's intent to excavate in the vicinity of the duct 10, will typically dispatch a technician to precisely locate the duct and mark its location typically using an industry standard color in accordance with the following scheme:

| | |
|---|---|
| Orange | Telephone, communications, television (CATV) |
| Yellow | Gas and gas distribution |
| Blue | Water |
| Green | Sewer |
| Red | Electric |
| White | Proposed work area |
| Purple | Water system and slurry |
| Pink | Survey area |

Despite the best efforts of the utility to locate and mark its buried conveyances, such as duct 10 in FIG. 1, a contractor may not become aware of such markings. In rare instances, the utility may fail to properly locate and mark its buried conveyance. In either circumstance, the failure of the contractor to become aware of the buried conveyance prior to excavation may lead to damage to the conveyance and even personal injury.

In accordance with present principles, there is provided a passive warning mechanism to alert a contractor of the presence of a buried conveyance (e.g., duct 10). To that end, the duct 10 of FIG. 1 carries a water-soluble material 16, which in the preferred embodiment, comprises a water-soluble, environmentally benign dye embedded in the duct. The color of the dye 16 corresponds to the type marking desired for the particular duct 10 in accordance with industry standards, i.e., orange for Telephone, communications, and television (CATV).

Figure 2:
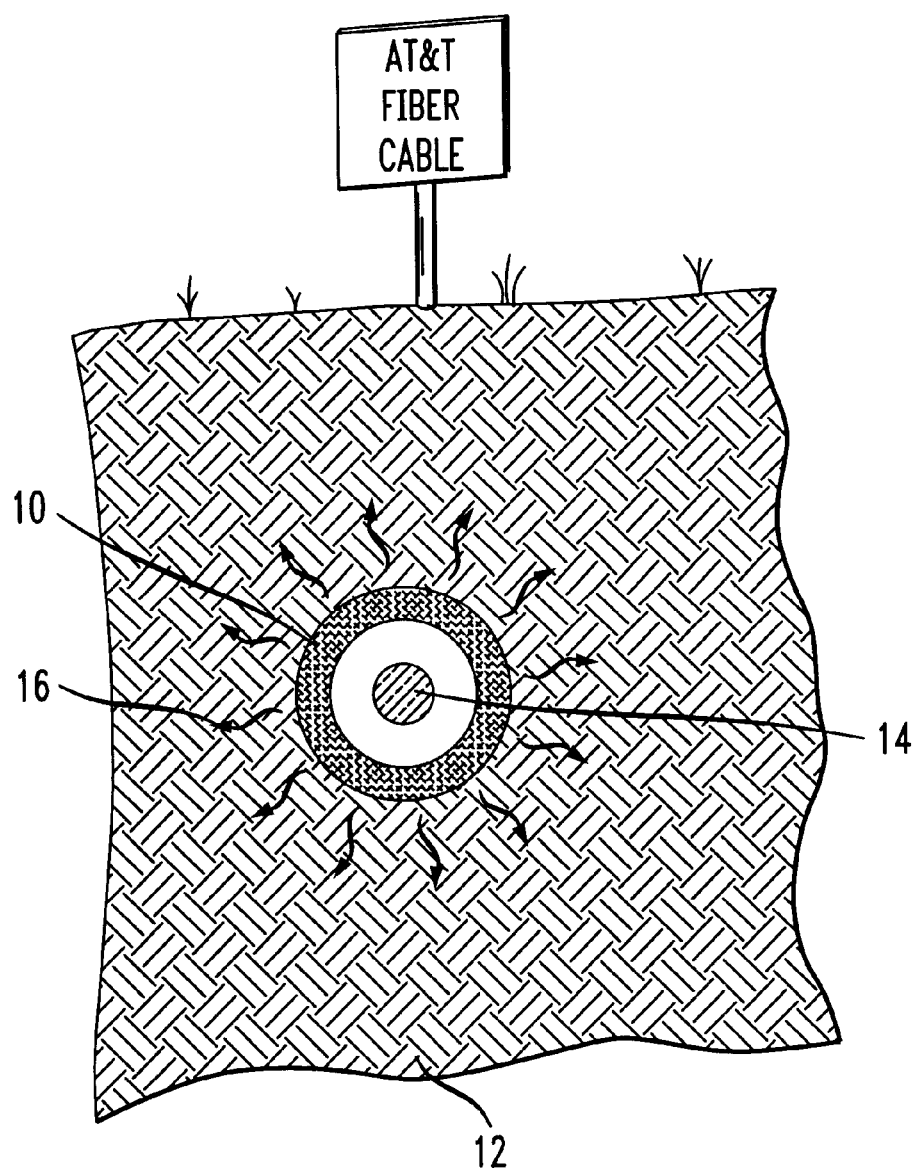
FIG. 2 shows an end view of the conveyance of FIG. 1.

As seen in FIG. 2, upon exposure of the duct 10 to moisture (e.g., rainwater absorbed in the surrounding earth 12), the dye 16 bleeds from the duct into the surrounding earth 12 to discolor it the same color as the dye. Thus, for example, if the duct 10 has an orange-colored dye 16 embedded therein, the surrounding earth 12 will eventually appear orange-colored as the dye bleeds from the duct. Thus, a contractor excavating in the area of the duct 10, upon seeing the orange-colored soil, will immediately become aware of existence of the duct 10 before it becomes visible without any intervention by the contractor or the utility.

Having the dye 16 embedded within the duct 10 is preferable, as compared to other schemes for associating a warning material with the duct. As compared to painting or coating the duct 10 with a water-soluble paint or pigment, embedding the dye 16 in the duct provides a longer-lasting technique for discoloring the surrounding soil. A water-soluble paint or pigment coating on the duct 10 will likely dissipate more quickly than the embedded dye. However, in the case of a metallic or concrete pipe, embedding a dye may not prove possible. Coating such a pipe with a water-soluble warning material may represent a more practical, albeit less long-lasting approach.

The above-described embodiments merely illustrate the principles of the invention. Those skilled in the art may make various modifications and changes that will embody the principles of the invention and fall within the spirit and scope thereof.

What is claimed is:

1. A passive warning mechanism for a utility conveyance buried in surrounding earth for providing an alert of the presence of the conveyance, comprising:
   a water-soluble material which originates on the conveyance, not in the earth, and is disposed in physical contact with the conveyance, the material, when exposed to moisture, will bleed from the conveyance to discolor the surrounding earth, thereby providing a visual alert to anyone excavating near the conveyance.

2. The passive warning mechanism according to claim 1 wherein the water-soluble material comprises a dye embedded within the conveyance.

3. The passive warning mechanism according to claim 1 wherein the water-soluble material comprises a paint coating on the surface of the conveyance.

4. The passive warning mechanism according to claim 1 wherein the water-soluble material has a particular color that designates a particular type of conveyance.

5. The passive warning mechanism according to claim 1 wherein the conveyance comprises a duct for carrying at least one cable.

6. A utility conveyance for burial underground in surrounding earth, comprising:
   a hollow duct; and
   a water-soluble material which originates on the duct, not in the earth, and is disposed in physical contact with the duct, the material, when exposed to moisture, will bleed from the duct to discolor the surrounding earth, thereby providing a visual alert to anyone excavating near the duct.

7. The utility conveyance according to claim 6 wherein the water-soluble material comprises a dye embedded within the duct.

8. The utility conveyance according to claim 6 wherein the water-soluble material comprises a paint coating on the surface of the duct.

9. The utility conveyance according to claim 6 wherein the water-soluble material has a particular color that designates a particular type of cable carried within the duct.

* * * * *